US010542413B2

(12) United States Patent
Moore et al.

(10) Patent No.: US 10,542,413 B2
(45) Date of Patent: Jan. 21, 2020

(54) DEFAULT ROAMING RESTRICTIONS SPECIFIC TO ROAMING CLASSES OF SERVICE

(71) Applicant: HEWLETT PACKARD ENTERPRISE DEVELOPMENT LP, Houston, TX (US)

(72) Inventors: Tiffany A. Moore, Omaha, NE (US); John I. Ayers, Omaha, NE (US); Michelle Mitchell, Plano, TX (US); Anders H. Askerup, Omaha, NE (US); David C. Williamson, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 210 days.

(21) Appl. No.: 15/755,067

(22) PCT Filed: Apr. 18, 2016

(86) PCT No.: PCT/US2016/028042
§ 371 (c)(1),
(2) Date: Feb. 24, 2018

(87) PCT Pub. No.: WO2017/184103
PCT Pub. Date: Oct. 26, 2017

(65) Prior Publication Data
US 2018/0249316 A1 Aug. 30, 2018

(51) Int. Cl.
H04W 8/02 (2009.01)
(52) U.S. Cl.
CPC ..................... H04W 8/02 (2013.01)
(58) Field of Classification Search
CPC combination set(s) only.
See application file for complete search history.

(56) References Cited

U.S. PATENT DOCUMENTS 6,148,197 A * 11/2000 Bridges .................. H04W 4/24
455/419
8,644,819 B2 2/2014 Shkut et al.
(Continued)

FOREIGN PATENT DOCUMENTS

WO WO-2014160935 A2 10/2014
WO WO-2014160978 A2 10/2014
WO WO-2014184349 A1 11/2014

OTHER PUBLICATIONS

Arnab Dey et al., "Realization of Interworking in LTE Roaming Using a Diameter-based Interworking Function," Journal of Cyber Security and Mobility, Mar. 12, 2013, pp. 289-308, vol. 1, Diametrig, LLC.

(Continued)

Primary Examiner — Charles N Appiah
Assistant Examiner — Xiang Zhang
(74) Attorney, Agent, or Firm — Hewlett Packard Enterprise Patent Department

(57) ABSTRACT

In some examples, a computer-readable medium includes instructions. The instructions may be executable by a processing resource to maintain a default roaming restrictions database that stores default roaming restriction attributes specific to roaming classes of service defined by a network operator. The default roaming restriction attributes may be specific to the roaming classes of service independent of mobile country code and mobile network code. The instructions may also be executable by the processing resource to perform a lookup into the default roaming restrictions database to identify a particular default roaming restriction attribute specific to a particular roaming class of service defined by the network operator.

13 Claims, 5 Drawing Sheets

(56) References Cited

U.S. PATENT DOCUMENTS

| | | |
|---|---|---|
| 2006/0223528 A1 | 10/2006 | Smith |
| 2006/0262752 A1* | 11/2006 | Moore ................. H04L 63/102 370/331 |
| 2008/0013470 A1 | 1/2008 | Kopplin |
| 2009/0061860 A1* | 3/2009 | Jiang ................... H04M 3/2281 455/433 |
| 2010/0291924 A1 | 11/2010 | Antrim et al. |
| 2012/0163297 A1 | 6/2012 | Agarwal et al. |
| 2013/0171988 A1* | 7/2013 | Yeung .................... H04W 8/12 455/432.1 |

OTHER PUBLICATIONS

International Search Report and Written Opinion, International Application No. PCT/US2016/028042, Date: Jan. 16, 2017, pp. 1-12, KIPO.

\* cited by examiner

DEFAULT ROAMING RESTRICTIONS SPECIFIC TO ROAMING CLASSES OF SERVICE

BACKGROUND

Rapid advances in electronics and communication technologies, driven by immense customer demand, have resulted in the widespread adoption of mobile devices. Some estimates indicate that (as just three examples) the United States, Italy, and the United Kingdom have more mobile phones in use in each country than there are people living in those countries. Vast communication networks support communications by mobile devices across sprawling geographical expanses. Increasing the capability and efficiency of these communication networks may result in even further use of mobile devices.

BRIEF DESCRIPTION OF THE DRAWINGS

Certain examples are described in the following detailed description and in reference to the drawings.

DETAILED DESCRIPTION

Figure 1:
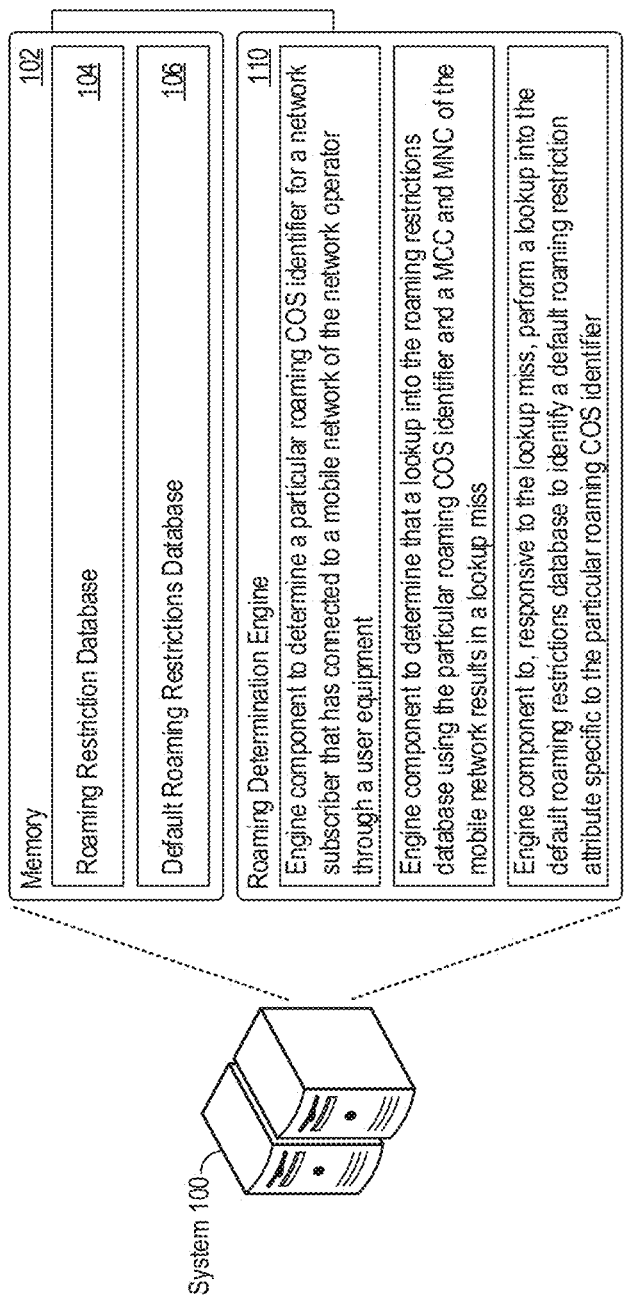
FIG. 1 shows an example of a system that supports application of default roaming restrictions specific to roaming classes of service.

The discussion below refers to roaming classes of service. A roaming class of service (COS) may refer to any mechanism that differentiates management of network traffic for roaming network connections, for example based on geographical, locational, user identification, or network identification parameters. In the context of mobile networks, network operators may define roaming classes of service specific to various mobile networks (e.g., according to mobile country code-mobile network code combinations identifying a particular mobile network), geographical regions of a country, state, county, or any other zone.

As illustrative examples, a network operator in the United States may define roaming classes of service that include a "tier one partner COS", (which may indicate partner mobile networks that a network subscriber is authorized to utilize), "west coast roaming COS" (which may indicate that the network subscriber roams for mobile networks in a "west coast" geographical area, for example identified through a home address of the network subscriber), a "VIP user roaming COS" (which may indicate that a high priority network subscriber is unaffected by geographical or network parameters), a "New York roaming COS", a "midwest region roaming COS", and the like. Roaming may occur when a network subscriber connects to a mobile network not subscribed to by the network subscriber or within a geographical location associated with the roaming COS. In such cases, a network operator may specify the mobile network behavior applicable to the network subscriber, e.g., whether to allow or deny roaming network connections or connection limitations to apply when the network subscriber initiates a roaming network connection.

The discussion below also refers to roaming restrictions, which may refer to the particular mobile network behavior that a network operator may specify for a particular roaming COS (e.g., for user subscriptions assigned the particular roaming COS). Roaming restrictions specific to a particular roaming COS may thus include particular roaming restriction attributes a network operator may define for the particular roaming COS. Roaming restriction attributes may enhance, limit, or deny connectivity to a mobile network, for example. Examples of roaming restriction attributes are described in greater detail below.

Examples consistent with the present disclosure may support application of default roaming restrictions on a per-roaming COS basis. That is, different roaming classes of service may be assigned different default roaming restrictions. In that regard, the features described herein may support specification of default mobile network behaviors (e.g., default roaming restrictions) that vary across different roaming classes of service.

As described in greater detail below, default roaming restrictions may allow a network operator to specify fallback mobile network behavior applicable to defined roaming classes of service when more specific, higher granularity roaming restrictions have not been enumerated by the network operator (e.g., roaming restrictions specified for a particular roaming COS, mobile country code, and mobile network code combination). The default roaming restriction features described herein may thus provide increased flexibility for network operators in controlling mobile network operations, for example through enabling default feature functionality based on geographical region. Doing so may result in reduced resource consumption and increased network efficiency, as default roaming restriction attributes may be specified and applied with increased efficiency.

FIG. 1 shows an example of a system 100 that supports application of default roaming restrictions specific to roaming classes of service. The system 100 may take the form of any computing system, including a single or multiple computing devices such as servers, compute nodes, desktop or laptop computers, embedded controllers, and more. The system 100 may be part of a mobile network that provides data communications for mobile devices. In some examples, the system 100 implements network logic that stores, tracks, validates, or otherwise manages user subscription data for the mobile network. Thus, in these examples, the system 100 may implement a home subscriber server (HSS), home location register (HLR), authentication, authorization, and accounting (AAA) server, or any other user subscription logic of a mobile network.

The system 100 may determine roaming restrictions applicable to a particular roaming COS, and particularly default roaming restrictions for a particular roaming COS when no specific roaming restrictions have been specified at a higher granularity. In some implementations, a network operator may specify roaming restrictions applicable for when a network subscriber assigned a particular roaming COS connects to various mobile networks operated by network operators. A network operator may refer to any entity that implements, controls, maintains, or supports any portion of a mobile network. Network operators may thus include mobile carriers, network providers, telecommunications companies, wireless service providers, and the like.

In some examples network operators (e.g., mobile carriers) may be identified through a mobile country code (MCC) and mobile network code (MNC) value pair. The specific mobile network that a network subscriber connects to (e.g., through a user equipment) may be identified by a MCC-MNC pair. A particular network operator may specify various roaming restrictions applicable to a particular roaming COS when network subscribers assigned the particular roaming COS connect to various mobile networks identified through varying MCC-MNC combinations.

The roaming restrictions specified by a network operator may take the form of roaming restriction attributes applicable to a network subscriber assigned a particular roaming COS (e.g., applicable to roaming network connections of the network subscriber). A roaming restriction attribute may define any characteristic of network behavior or adjustment to network behavior for a network subscriber. Roaming restriction attributes may thus include, as an example, a roaming action attribute indicative of whether to allow, restrict, or deny a roaming network connection. As other examples, roaming restriction attributes may enhance or limit connectivity by specifying the network access points that the network subscriber can connect to. As such, roaming restriction attributes may include classes of service for access point name (APN) screening, suppression or allowance of APN operator identifier replacements, or in other ways.

In some implementations, the system 100 may track, store, access, or identify roaming restrictions through a roaming restrictions database. In the example shown in FIG. 1, the system 100 includes a memory 102 that stores a roaming restrictions database 104. The memory 102 may take the form of any medium that stores data, and may thus include a combination of volatile and non-volatile memories such as Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like. The roaming restrictions database 104 may store roaming restriction attributes for roaming classes of service defined by a network operator according to a roaming COS identifier field, an MCC field, and an MNC field.

Entries in the roaming restrictions database 104 may include values for the roaming COS identifier field, MCC field, and MNC field, and this value combination may serve as a key to the default roaming restrictions database 104. That is, the combination of the roaming COS-MCC—attributes may uniquely identify entries in the roaming restrictions database 104. Entries in the roaming restrictions database 104 may specify roaming restriction attributes applicable to a specific roaming COS and network connections to a specific mobile network. Such roaming restriction attributes may thus indicate specific mobile network behavior particular to a roaming COS and MCC-MNC combination, as opposed to default roaming restrictions applicable to the roaming COS generally (e.g., for roaming network connections characterized by a roaming COS-MCC-MNC combination not stored in the roaming restrictions database 104) or system-level roaming restriction attributes.

The system 100 may also access default roaming restrictions for roaming classes of service. In the example shown in FIG. 1, the memory 102 stores a default roaming restrictions database 106. The default roaming restrictions database 106 may store default roaming restriction attributes specific to the roaming classes of services according to the roaming COS identifier field, but not the MCC field and not the MNC field. That is, the default roaming restrictions database 106 may store different default roaming restriction attributes for different roaming classes of service defined by network operators. The default roaming restrictions database 106 may thus include a first entry including a first default roaming restriction attribute specific to a first roaming COS identified through a first roaming COS identifier as well as a second entry including a second default roaming restriction attribute specific to a second roaming COS identified through a second roaming COS identifier, the first default roaming restriction attribute being different from the second default roaming restriction attribute.

In operation, when a network subscriber assigned a particular roaming COS connects to a mobile network, the system 100 may access the roaming restrictions database 104 to identify the specific roaming restriction attributes to apply for roaming network connections of the network subscriber. When the specific roaming restrictions attributes are not specified for the particular roaming COS-MCC-MNC combination, the system 100 may instead determine default roaming restrictions to apply for the network subscriber by accessing the default roaming restrictions database 106 according to an identifier of the particular roaming COS (e.g., according to a roaming COS name or identification value). The system 100 may thus support default roaming restriction behavior on a per-roaming COS basis.

The system 100 may implement various engines to provide or support any of the default roaming restriction features described herein. In the example shown in FIG. 1, the system 100 implements a roaming determination engine 110. The system 100 may implement the roaming determination engine 110 (and components thereof) in various ways, for example as hardware and programming. The programming for the roaming determination engine 110 may take the form of processor-executable instructions stored on a non-transitory machine-readable storage medium, and the processor-executable instructions may, upon execution, cause hardware to perform any of the features described herein. In that regard, various programming instructions or modules of the roaming determination engine 110 may implement engine components to support or provide the features described herein. The hardware for the roaming determination engine 110 may include a processing resource to execute those instructions. A processing resource may include various number of processors and may be implemented through single-processor or multi-processor architectures.

The roaming determination engine 110 may include components to support determination and application of default roaming restrictions on a per-roaming COS basis. In the example implementation shown in FIG. 1, the roaming determination engine 110 includes an engine component to determine a particular roaming COS identifier for a network subscriber that has connected to a mobile network of the network operator through a user equipment; an engine component to determine that a lookup into the roaming restrictions database 104 using the particular roaming COS identifier and an MCC and MNC of the mobile network results in a lookup miss; and an engine component to, responsive to the lookup miss, perform a lookup into the default roaming restrictions database 106 to identify a default roaming restriction attribute specific to the particular roaming COS identifier. These and other default roaming restriction features are described in greater detail next.

Figure 2:
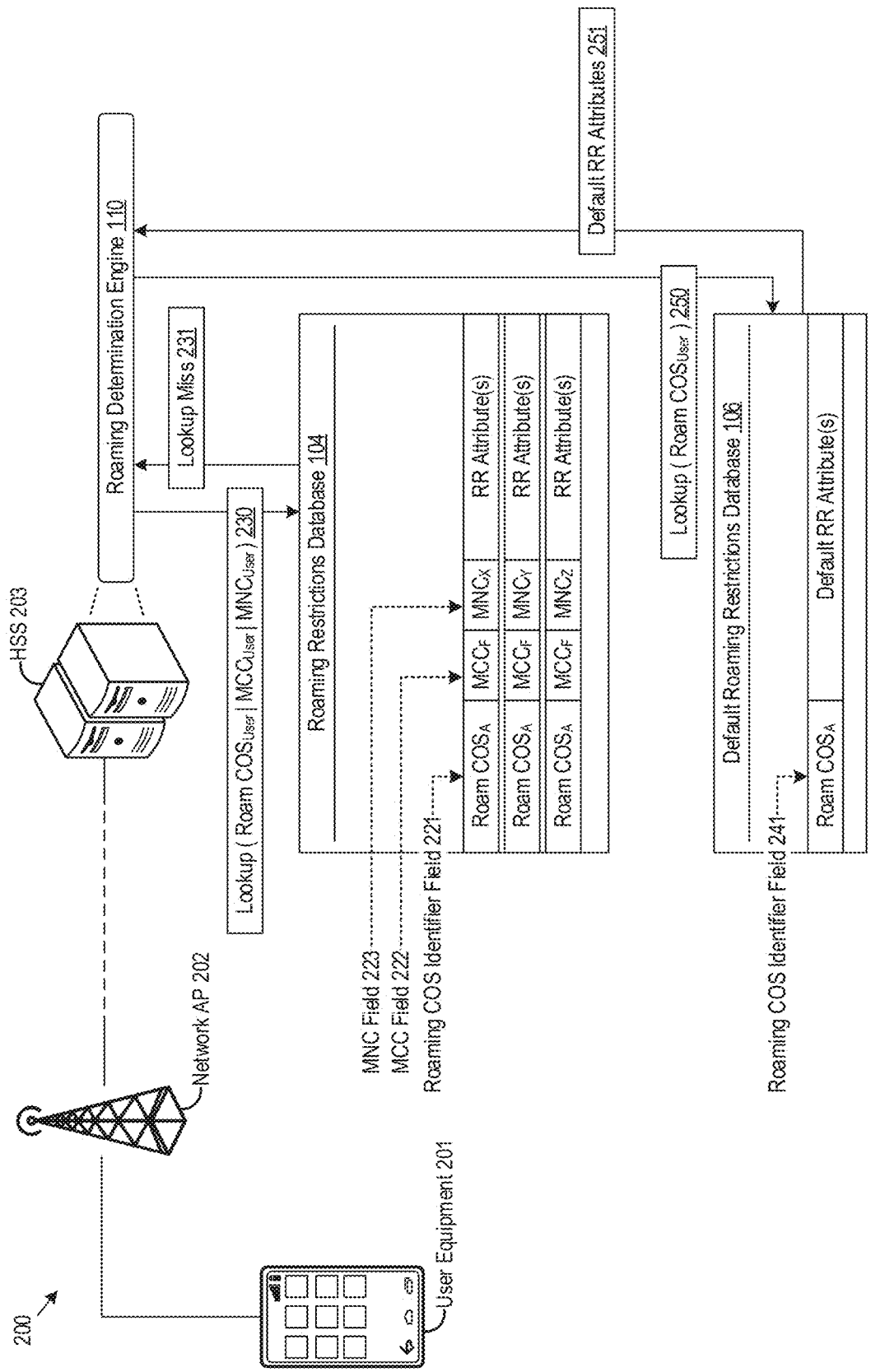
FIG. 2 shows an example of an architecture that supports application of default roaming restrictions specific to roaming classes of service.

FIG. 2 shows an example of an architecture 200 that supports application of default roaming restrictions specific to roaming classes of service. The architecture 200 shown in the example of FIG. 2 includes a user equipment 201, a network access point (AP) 202, and a home subscriber server (HSS) 203 that implements the roaming determination engine 110.

The user equipment 201 may connect to a mobile network through the network AP 202. In doing so, the mobile network may identify the network subscriber associated with the user equipment 201, for example through an update location request (ULR) or via other messaging exchanged between the user equipment 201 and the network AP 202 or other elements of the mobile network. The network AP 202 or other elements of the mobile network may store network and operator identification, such as the MCC and MNC of the mobile network that the network AP 202 links to. The HSS 203 (including the roaming determination engine 110) may receive communications from the mobile network (which the HSS 203 itself may be part of), the communications identifying the network subscriber associated with the user equipment 201 and the MCC and MNC of a roaming network connection by the user equipment 201.

Through identification of the network subscriber associated with the user equipment 201 as well as the MCC and MNC of the mobile network (e.g., through the network AP 202), the roaming determination engine 110 may determine whether to apply roaming restrictions to the roaming network connection of the network subscriber. In particular, the roaming determination engine 110 may do so when a particular roaming COS has been assigned to the network subscriber, which the roaming determination engine 110 may determine through accessing user subscription data of the network subscriber. Such user subscription data may be stored or accessible by the HSS 203. In the example in FIG. 2, the roaming determination engine 110 may identify the roaming COS, MCC, and MNC for the roaming network connection through the user equipment 201 shown in FIG. 2 as the values Roam $COS_{User}$, $MCC_{User}$, and $MNC_{User}$.

For network subscribers assigned a roaming COS by a network operator, the roaming determination engine 110 may identify roaming restriction attributes to apply for the roaming COS. When the network operator defines specific roaming restriction attributes for a particular roaming COS and a particular MCC-MNC pairing, such roaming restriction attributes may be stored in the roaming restrictions database 104. The roaming restrictions database 104 may be shared across multiple network providers and may thus include roaming restrictions specified by different network operators for various mobile networks operated and supported by different network operators.

As an example shown in FIG. 2, entries in the roaming restrictions database 104 may include a roaming COS identifier field 221 that identifies roaming classes of service (e.g., via a name or ID value) as well as an MCC field 222 that identifies the MCC and an MNC field 223 that identifies the MNC. The roaming COS identifier field 221, MCC field 222, and MNC field 223 may together form a key for the roaming restrictions database 104, as these three attributes may uniquely identify entries in the roaming restrictions database 104. Thus, entries for particular roaming COS-MNC-MCC combinations may include the roaming restriction attributes applicable for the entries. In FIG. 2, three example entries are depicted in the roaming restrictions database 104. In particular, the three entries specify roaming restriction attributes for the roaming COS-MCC-MNC combinations of (i) Roam $COS_A$-$MCC_F$-$MNC_X$; (ii) Roam $COS_A$-$MCC_F$-$MNC_Y$; and (iii) Roam $COS_A$-$MCC_F$-$MNC_Z$.

To determine whether roaming restrictions are specified for the Roam $COS_{User}$-$MCC_{User}$-$MNC_{User}$ combination identified for the network subscriber in FIG. 2, the roaming determination engine 110 may perform a lookup into the roaming restrictions database 104, for example through a lookup query 230 specifying Roam $COS_{User}$, $MCC_{User}$, and $MNC_{User}$ as lookup parameters. The lookup query 230 into the roaming restrictions database 104 may result in a lookup miss, which the roaming restrictions database 104 may indicate through a lookup miss message 231.

Through the lookup miss in the roaming restrictions database 104, the roaming determination engine 110 may determine that no roaming restrictions have been specified for the roaming COS assigned to the network subscriber (e.g., Roam $COS_{User}$) specifically when the network subscriber connects to the mobile network identified through the MCC-MNC pair of $MCC_{User}$-$MNC_{User}$. In such a case, the roaming determination engine 110 may determine default roaming restrictions to apply for the network subscriber, and the default roaming restrictions may be specific to the particular roaming COS identified as Roam $COS_{User}$. In doing so, the roaming determination engine 110 may identify default roaming restrictions to apply at a higher granularity than a system-level roaming restriction attribute (which may apply to all network subscribers, regardless of assigned roaming classes of service). Generic application of the system-level roaming restriction attribute when the Roaming COS-MCC-MNC combination is missing in the roaming restrictions database 104 may be broad and restrictive, and default roaming restrictions specified on a per-roaming COS basis may increase the flexibility at which network operators control network behavior.

In determining default roaming restrictions to apply to a network subscriber, the roaming determination engine 110 may perform a lookup into the default roaming restrictions database 106. The default roaming restrictions database 106 may store default roaming restriction attributes on a per-roaming COS basis. In some implementations, entries in the default roaming restrictions database 106 include a roaming COS identifier field 241, which may also serve as a key that uniquely identifies entries in the default roaming restrictions database 106. In that regard, the default roaming restrictions database 106 may specify default roaming restrictions specific to roaming classes of services defined by a network operator, and do so independent of MCC and MNC. In FIG. 2, the default roaming restrictions database 106 includes an example entry for the roaming COS identified as Roam $COS_A$, which specifies the default roaming restriction attributes to apply for the particular roaming COS identified as Roam $COS_A$.

The roaming determination engine 110 may perform a lookup into the default roaming restrictions database 106 responsive to a lookup miss in the roaming restrictions database 104. In FIG. 2, the roaming determination engine 110 performs a lookup into the default roaming restrictions database 106 through the lookup query 250. Lookup queries to the default roaming restrictions database 106 may specify a particular roaming COS to lookup, but not an MCC or MNC value associated with the roaming COS. Thus, the lookup query 250 may specify a lookup parameter for an entry with a roaming COS identifier as "Roam $COS_{User}$" (assigned to the network subscriber), but not specify any corresponding or associated MCC and MNC values. In FIG. 2, the lookup query 250 into the default roaming restrictions database 106 results in a lookup hit, and the default roaming restriction attributes 251 for the roaming COS assigned to the network subscriber, e.g., Roam $COS_{User}$.

Upon receiving the default roaming restriction attributes 251 for the roaming COS assigned to the network subscriber, the roaming determination engine 110 may apply the default roaming restriction attributes. In some examples, the roaming determination engine 110 applies roaming restrictions (e.g., the default roaming restriction attributes) by communicating roaming restriction attributes to other elements of the mobile network (e.g., the network AP 202) and/or the user equipment 201 for application. Thus, the roaming determination engine 110 may identify and apply default roaming restrictions specific to a particular roaming class of service defined by a network operator.

In the example shown in FIG. 2, the roaming restrictions database 104 and the default roaming restrictions database 106 are illustrated as separate entities. In some implementations, the roaming restrictions database 104 and the default roaming restrictions database 106 are implemented as separate data structure, e.g., as different tables stored on a memory. In other implementations, the roaming restrictions database 104 and the default roaming restrictions database 106 are implemented as different portions of a common data structure. For instance, the roaming restrictions database 104 may be a first set of entries and the default roaming restrictions database 106 may be a second set of entries in the same data structure (e.g., the same database, table, or other data structure).

Figure 3:
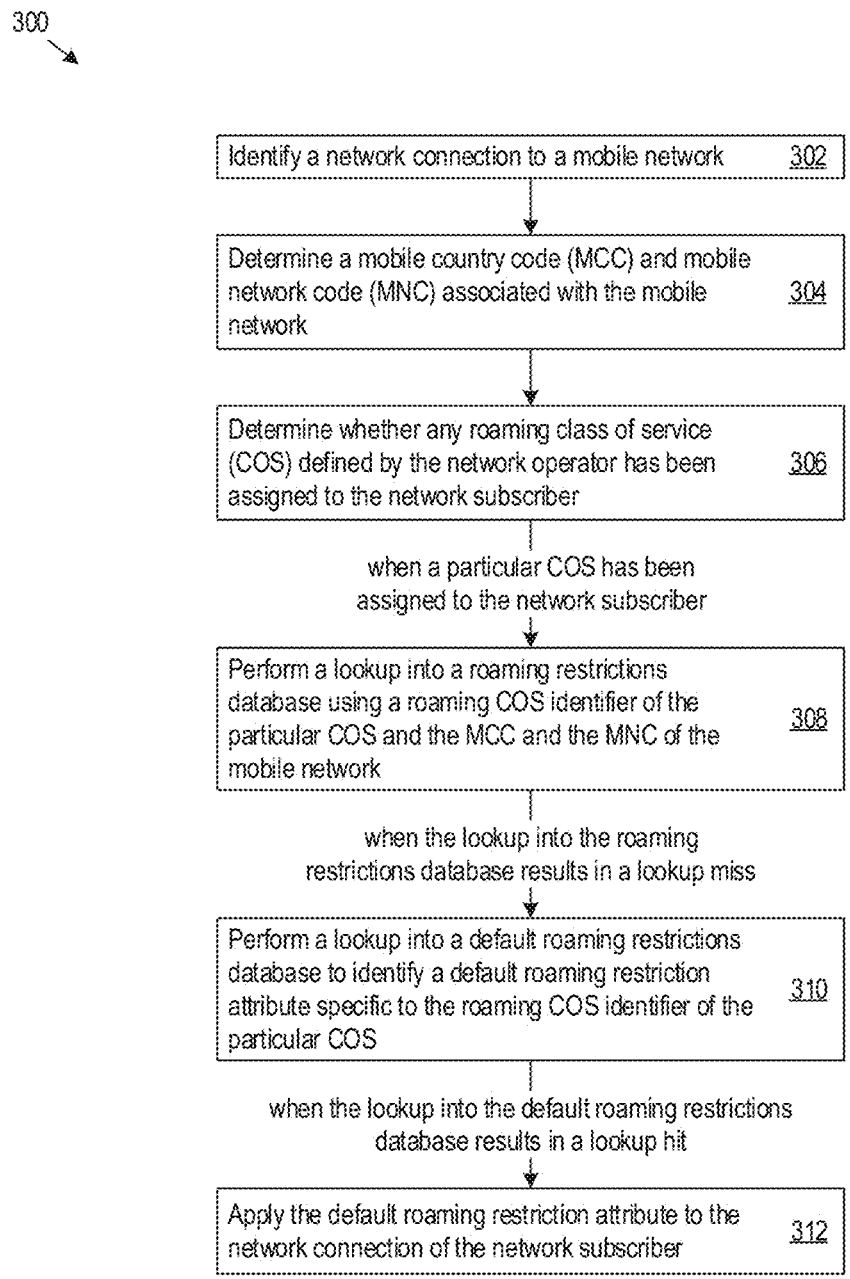
FIG. 3 shows a flow chart of an example method for applying default roaming restrictions specific to roaming classes of service.

FIG. 3 shows a flow chart of an example method 300 for applying default roaming restrictions specific to roaming classes of service. Execution of the method 300 is described with reference to the roaming determination engine 110, though any other device, hardware-programming combination, or other suitable computing system may execute any of the steps of the method 300. As examples, the method 300 may be implemented (e.g., by the roaming determination engine 110) in the form of executable instructions stored on a machine-readable storage medium or in the form of electronic circuitry.

In implementing or executing the method 300, the roaming determination engine 110 may identify a network connection to a mobile network, the network connection by a user equipment of a network subscriber (302). The roaming determination engine 110 may do so through identification of update location messaging or other handshake messages exchanged between the user equipment and the mobile network, for example. The roaming determination engine 110 may also determine the MCC and the MNC associated with the mobile network (304), which the roaming determination engine 110 may receive from an access point by which the user equipment connects to the mobile network, from other network logic in the mobile network, or from combinations thereof.

The roaming determination engine 110 may further determine whether any roaming COS defined by a network operator has been assigned to the network subscriber (306). Doing so may include accessing user subscription data of the network subscriber, which may be stored or maintained by a HSS that implements the roaming determination engine 110 or which the roaming determination engine 110 is communicatively linked to. When a particular roaming COS has been assigned to the network subscriber, the roaming determination engine 110 may determine whether the network connection is a roaming network connection and perform a lookup into a roaming restrictions database 104 using a roaming COS identifier of the particular roaming COS and the MCC and the MNC of the mobile network (308).

The roaming restrictions database 104 may store roaming restriction attributes for roaming classes of service defined by various network operators according to a roaming COS identifier field, an MCC field, and an MNC field. When the lookup into the roaming restrictions database 104 results in a lookup hit, the roaming determination engine 110 may identify a roaming restriction attribute specific to the COS identifier of the particular roaming COS and the MCC and the MNC of the mobile network. Then, the roaming determination engine 110 may apply the roaming restriction attribute (specific to the COS identifier of the particular roaming COS and the MCC and the MNC of the mobile network) to the roaming network connection of the network subscriber.

When the lookup into the roaming restrictions database 104 results in a lookup miss, the roaming determination engine 110 may perform a lookup into a default roaming restrictions database 106 to identify a default roaming restriction attribute specific to the roaming COS identifier of the particular roaming COS (310). The default roaming restrictions database 106 may store default roaming restriction attributes specific to roaming classes of services defined by the network operator according to a roaming COS identifier field, but not an MCC filed and not an MNC field. When the lookup into the default roaming restrictions database 106 results in a lookup hit, the roaming determination engine 110 may apply the default roaming restriction attribute to the roaming network connection of the network subscriber (312), e.g., by sending the default roaming restriction attribute for application and enforcement by other mobile network logic or devices in the mobile network or by the user equipment of the network subscriber.

In implementing or executing the method 300, the roaming determination engine 110 may further determine not to apply any roaming restriction attributes to the network connection of the network subscriber when no roaming COS has been assigned to the network subscriber (e.g., no network connections are characterized as roaming network connections or no modified network behavior is specified for roaming network connections). As another example, when the lookup into the default roaming restrictions database results in a lookup miss, the roaming determination engine 110 may identify a system-level roaming restriction attribute applicable to multiple roaming classes of service to apply to the network connection of the network subscriber.

While some example steps are shown in FIG. 3, the method 300 may include any number of additional or alternative steps as well, including steps implementing any other features described herein with respect to the roaming determination engine 110.

Figure 4:
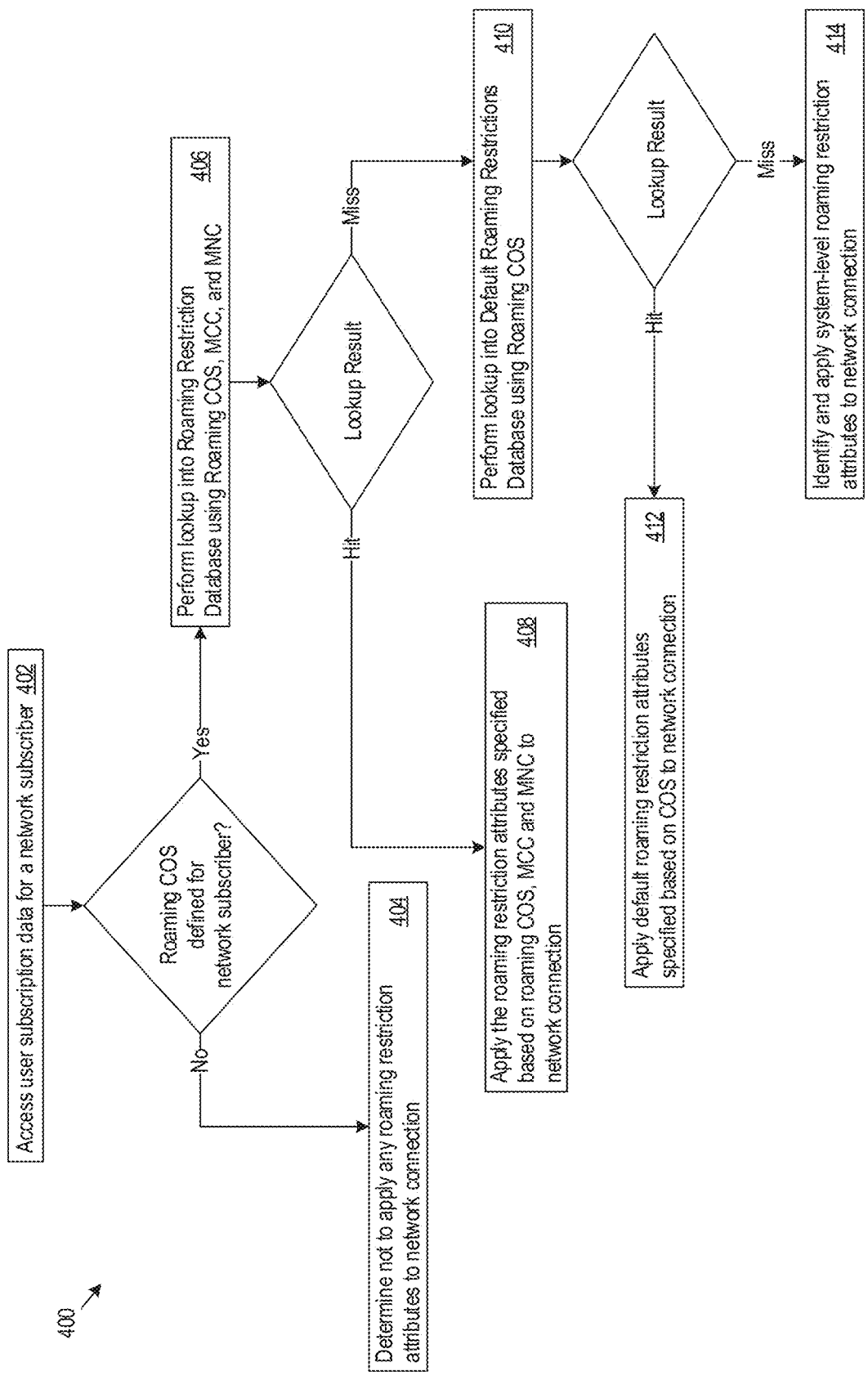
FIG. 4 shows a flow chart of another example method for applying default roaming restrictions specific to roaming classes of service.

FIG. 4 shows a flow chart of another example method 400 for applying default roaming restrictions specific to roaming classes of service. As with the method 300, execution of the method 400 is described with reference to the roaming determination engine 110, though any other device, hardware-programming combination, or other suitable computing system may execute any of the steps of the method 400. The method 400 may be implemented (e.g., by the roaming determination engine 110) in the form of executable instructions stored on a machine-readable storage medium or in the form of electronic circuitry, for example.

The roaming determination engine 110 may execute the method 400 to determine roaming restrictions to apply for a network connection of a network subscriber. As such, identification of such a network connection may trigger the roaming determination engine 110 to execute the method 400. The roaming determination engine 110 may access user subscription data for a network subscriber (402). Such user subscription data may be stored in an HSS, and the user subscription data may indicate whether a network operator has assigned a roaming COS to the network subscriber. Thus, the roaming determination engine 110 may determine whether a roaming COS is defined for the network subscriber, e.g., whether a roaming COS is specified in the subscription data. When a roaming COS is not defined in the user subscription data, the roaming determination engine 110 may determine that no roaming restrictions are to be applied to roaming network connections of the network subscriber. In that regard, the roaming determination engine 110 may determine not to apply any roaming restriction attributes to the network connection of the network subscriber (404).

When a roaming COS is defined in the subscription data, the roaming determination engine 110 may determine whether roaming restrictions have been specified for the particular roaming COS defined in the user subscription data. In particular, the roaming determination engine 110 may identify the mobile network accessed by the network subscribers through the MCC and MNC. Then, the roaming determination engine 110 may perform a lookup into the roaming restrictions database 104 using an identifier of the particular roaming COS, the MCC, and the MNC (406). When the lookup into the roaming restrictions database 104 results in a lookup hit, the roaming determination engine 110 may identify the roaming restriction attributes included in the entry that caused the lookup hit, which may be roaming restrictions specified based on the specific combination of the particular roaming COS, the identified MCC, and the identified MNC for the network connection of the network subscriber. The roaming determination engine 110 may then apply these roaming restriction attributes specified based on roaming COS, MCC, and MNC to the network connection of the network subscriber (408).

When the lookup into the roaming restrictions database 104 results in a lookup miss, the roaming determination engine 110 may determine default roaming restrictions specific to the particular roaming COS assigned to the network subscriber. In doing so, the roaming determination engine 110 may perform a lookup into the default roaming restrictions database 106 using an identifier of the particular roaming COS as a lookup parameter (410). When the lookup into the default roaming restrictions database 106 results in a lookup hit, the roaming determination engine 110 may identify the default roaming restriction attributes specified for the particular roaming COS (e.g., from the entry in the default roaming restrictions database 106 returned by the lookup query). Then, the roaming determination engine 110 may apply the default roaming restriction attributes specified for the particular roaming COS assigned to the network subscriber (412). That is, the roaming determination engine 110 may apply the default roaming restriction attributes to a roaming network connection of the network subscriber.

When the lookup into the default roaming restrictions database 106 results in a lookup miss, the roaming determination engine 110 may identify and apply a system-level roaming restriction attributes to the roaming network connection (414). The system-level roaming restriction attribute may be applicable to multiple, different roaming classes of service. For example, the system-level roaming restriction may specify at a system level whether roaming is allowed, denied, or restricted, and such an attribute may be independent of specific roaming classes of service, MCC, MCC, and even network operators. When an HSS supports multi-tenancy, for example, the HSS may determine and apply roaming restrictions for network connections for multiple network operators. In this example, the system-level roaming restriction attribute may apply to roaming network connections for subscribers of each of the network operators hosting user subscription data on the multi-tenant HSS.

In maintaining or accessing a default roaming restrictions database 106, the roaming determination engine 110 may provide increased flexibility in specifying roaming restriction behavior for network connections, e.g., as compared to system-level roaming restrictions applied at a system level. Through the default roaming restrictions database 106, network operators may flexibly specify default roaming restrictions on a per-roaming COS basis, which may be accomplished without specifically enumerating each of the MCC-MNC combinations for mobile networks that a network subscriber may connect to (although the network operator may specify roaming restriction behavior for any number of the MCC-MNC combinations in the roaming restrictions database 104). For multi-tenant HSS implementations, the default roaming restrictions database 106 may also provide network-operator specific behavior for default roaming restrictions, which may not be possible through system-level roaming restriction attributes.

While some example steps are shown in FIG. 4, the method 400 may include any number of additional or alternative steps as well, including steps implementing any other features described herein with respect to the roaming determination engine 110. Table 1 below provides some example features that the roaming determination engine 110 may provide in executing the method 400, in implementing any of the default roaming restriction features described herein, or through combinations thereof.

TABLE 1

Example Roaming Restriction Application by the Roaming Determination Engine

| Roaming COS for network subscriber | Lookup in Roaming Restrictions Database 104 | Lookup in Default Roaming Restrictions Database 106 | Applied Roaming Restrictions |
|---|---|---|---|
| Undefined | N/A | N/A | No Roaming Restrictions applied (e.g., no APN Screening applied). |
| Defined | Match Found for roaming COS-MCC-MNC | N/A | Roaming Restrictions applied based on entry in Roaming Restrictions Database 104, e.g., APN Screening based on APN Screening COS in entry of Roaming Restrictions Database 104. |
| Defined | Match Not Found for roaming COS-MCC-MNC | Match Found for roaming COS | Roaming Restrictions applied based on entry in Default Roaming Restrictions Database 106, e.g., APN Screening applied based on entry in Default Roaming Restrictions Database. |
| Defined | Match Not Found for roaming COS-MCC-MNC | Match Not Found for roaming COS | Roaming Restrictions applied based on system-level roaming restriction attributes, e.g., APN Screening based on system-level APN Screening COS. |

The roaming determination engine 110 may thus identify and apply roaming restrictions for a roaming COS, which may include default roaming restrictions specified by a network operator on a per-roaming COS basis.

Figure 5:
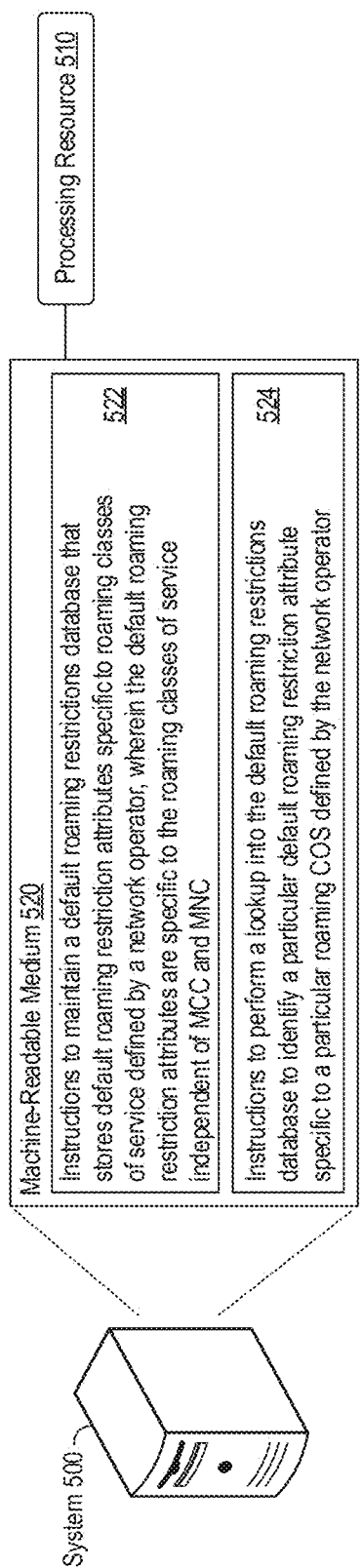
FIG. 5 shows an example of a system that supports application of default roaming restrictions specific to roaming classes of service.

FIG. 5 shows an example of a system 500 that supports application of default roaming restrictions specific to roaming classes of service. The system 500 may include a processing resource 510, which may take the form of a single or multiple processors. The processor(s) may include a central processing unit (CPU), microprocessor, or any hardware device suitable for executing instructions stored on a machine-readable medium, such as the machine-readable medium 520 shown in FIG. 5. The machine-readable medium 520 may be any non-transitory electronic, magnetic, optical, or other physical storage device that stores executable instructions, such as the instructions 522 and 524 in FIG. 5. As such, the machine-readable medium 520 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 500 may execute instructions stored on the machine-readable medium 520 through the processing resource 510. Executing the instructions may cause the system 500 to perform any of the default roaming restriction features described herein, including according to any features of the roaming determination engine 110.

For example, execution of the instructions 522 and 524 by the processing resource 510 may cause the system 500 to maintain a default roaming restrictions database 106 that stores default roaming restriction attributes specific to roaming classes of service defined by a network operator, wherein the default roaming restriction attributes are specific to the roaming classes of service independent of MCC and MNC (instructions 522) and perform a lookup into the default roaming restrictions database 106 to identify a particular default roaming restriction attribute specific to a particular roaming COS defined by the network operator (instructions 524). The particular default roaming restriction attribute may be specified to the particular roaming COS in that the particular default roaming restriction attribute is not applicable for a different roaming COS defined by the network operator.

In some examples, the machine-readable medium 520 may include instructions executable by the processing resource 510 to perform the lookup into the default roaming restrictions database responsive to a lookup miss for a lookup into a roaming restriction database that stores roaming restriction attributes for the roaming classes of service defined by the network operator according to a roaming COS identifier field, an MCC field, and an MNC field. As another example, the instructions stored in the machine-readable medium 520 may be executable by the processing resource 510 further to identify a system-level roaming restriction attribute applicable to multiple roaming classes of service responsive to the lookup into the default roaming restrictions database resulting in a lookup miss.

The systems, methods, devices, engines, and processes described above, including the roaming determination engine 110, may be implemented in many different ways in many different combinations of hardware, logic, circuitry, and executable instructions stored on a machine-readable medium. For example, the roaming determination engine 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the roaming determination engine 110.

The processing capability of the systems, devices, and engines described herein, including the roaming determination engine 110, may be distributed among multiple system components, such as among multiple processors and memories, which may include multiple distributed processing systems. Parameters, databases, and other data structures, such as the roaming restrictions database 104 and the default roaming restrictions database 106, may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   identifying a network connection to a mobile network, the network connection by a user equipment of a network subscriber that has roamed into a location of the mobile network;
   determining a mobile country code (MCC) and mobile network code (MNC) associated with the mobile network;
   determining whether any roaming class of service (COS) defined by a network operator has been assigned to the network subscriber;
   when a particular roaming COS has been assigned to the network subscriber:
      performing a lookup into a roaming restrictions database using a roaming COS identifier of the particular roaming COS and the MCC and the MNC of the mobile network;
      when the lookup into the roaming restrictions database results in a lookup miss:
         performing a lookup using the roaming COS identifier into a default roaming restrictions database storing default roaming restriction attributes specific to roaming classes of service according to roaming COS identifier fields to identify a default roaming restriction attribute specific to the roaming COS identifier of the particular roaming COS; and
         when the lookup into the default roaming restrictions database results in a lookup hit, applying the default roaming restriction attribute to the network connection of the network subscriber.

2. The method of claim 1, further comprising, when no roaming COS has been assigned to the network subscriber:
   determining not to apply any roaming restriction attributes to the network connection of the network subscriber.

3. The method of claim 1, further comprising, when the lookup into the roaming restrictions database results in a lookup hit:
   identifying a roaming restriction attribute specific to the COS identifier of the particular roaming COS and the MCC and the MNC of the mobile network; and applying the roaming restriction attribute specific to the COS identifier of the particular roaming COS and the MCC and the MNC of the mobile network to the network connection of the network subscriber.

4. The method of claim 1, further comprising, when the lookup into the default roaming restrictions database results in a lookup miss:
identifying a system-level roaming restriction attribute applicable to multiple roaming classes of service to apply to the network connection of the network subscriber.

5. The method of claim 1, wherein the roaming restriction database stores roaming restriction attributes for roaming classes of service defined by the network operator according to a roaming class of service (COS) identifier field, an MCC field, and an MNC field.

6. The method of claim 1, wherein the default roaming restrictions database stores default roaming restriction attributes specific to roaming classes of services defined by the network operator according to a roaming COS identifier field, but not an MCC filed and not an MNC field.

7. A system comprising:
a memory storing:
a roaming restriction database to store roaming restriction attributes for roaming classes of service defined by a network operator according to a roaming class of service (COS) identifier field, a mobile country code (MCC) field, and a mobile network code (MNC) field; and
a default roaming restrictions database to store default roaming restriction attributes specific to the roaming classes of services according to the roaming COS identifier field, but not the MCC field and not the MNC field; and
a roaming determination engine to:
determine a particular roaming COS identifier for a network subscriber that has roamed to a location of and has established a network connection to a mobile network of the network operator through a user equipment;
determine that a lookup into the roaming restrictions database using the particular roaming COS identifier and an MCC and MNC of the mobile network results in a lookup miss;
responsive to the lookup miss, perform a lookup into the default roaming restrictions database using the particular roaming COS identifier of a particular roaming COS assigned to the network subscriber to identify a default roaming restriction attribute specific to the particular roaming COS identifier; and
responsive to the lookup into the default roaming restrictions database resulting in a lookup hit, determine a particular default roaming restriction attribute specific to the particular roaming COS identifier and apply the particular default restriction attribute to the network connection of the network subscriber.

8. The system of claim 7, wherein the roaming determination engine is further to, responsive to the lookup into the default roaming restrictions database resulting in a lookup miss:
identify a system-level roaming restriction attribute applicable to multiple roaming classes of service to apply for the network subscriber.

9. The system of claim 7, wherein the memory implements the roaming restriction database and the default roaming restrictions database in a common data structure.

10. The system of claim 7, wherein the default roaming restrictions database comprises:
a first entry including a first default roaming restriction attribute specific to a first roaming COS identified through a first roaming COS identifier; and
a second entry including a second default roaming restriction attribute specific to a second roaming COS identified through a second roaming COS identifier, wherein the first default roaming restriction attribute is different from the second default roaming restriction attribute.

11. A non-transitory machine-readable medium storing instructions executable by a processing resource to:
maintain a default roaming restrictions database that stores default roaming restriction attributes specific to roaming classes of service defined by a network operator, wherein the default roaming restriction attributes are specific to the roaming classes of service independent of mobile country code (MCC) and mobile network code (MNC); and
responsive to user equipment of a network subscriber roaming to a location of a mobile network, and establishing a network connection to the mobile network, perform a lookup into the default roaming restrictions database using just a roaming class of service (COS) identifier of a particular roaming COS defined by the network operator and assigned to the network subscriber to identify a particular default roaming restriction attribute specific to the particular roaming COS, wherein the lookup into the default roaming restrictions database is responsive to a lookup miss for a lookup into a roaming restriction database that stores roaming restriction attributes for the roaming classes of service defined by the network operator according to a roaming COS identifier field, an MCC field, and an MNC field; and
apply the particular default roaming restriction attribute to the network connection of the network subscriber.

12. The non-transitory machine-readable medium of claim 11, wherein the particular default roaming restriction attribute is not applicable for a different roaming COS defined by the network operator.

13. The non-transitory machine-readable medium of claim 11, wherein the instructions are executable by the processing resource further to, responsive to the lookup into the default roaming restrictions database resulting in a lookup miss:
identify a system-level roaming restriction attribute applicable to multiple roaming classes of service.

* * * * *